June 15, 1948.  R. L. J. B. SANMORI  2,443,433
FLUID PRESSURE SUSPENSION SYSTEM FOR VEHICLES
Filed Jan. 12, 1946  7 Sheets-Sheet 1

June 15, 1948. R. L. J. B. SANMORI 2,443,433
FLUID PRESSURE SUSPENSION SYSTEM FOR VEHICLES
Filed Jan. 12, 1946 7 Sheets-Sheet 2

June 15, 1948. R. L. J. B. SANMORI 2,443,433
FLUID PRESSURE SUSPENSION SYSTEM FOR VEHICLES
Filed Jan. 12, 1946 7 Sheets-Sheet 4

June 15, 1948.  R. L. J. B. SANMORI  2,443,433
FLUID PRESSURE SUSPENSION SYSTEM FOR VEHICLES
Filed Jan. 12, 1946  7 Sheets-Sheet 5

Patented June 15, 1948

2,443,433

UNITED STATES PATENT OFFICE 2,443,433

FLUID PRESSURE SUSPENSION SYSTEM FOR VEHICLES

Roger Laurent Jean Baptiste Sanmori, Monaco, Monaco

Application January 12, 1946, Serial No. 640,807
In France August 16, 1945

14 Claims. (Cl. 280—124)

The present invention relates to vehicle suspension systems, the expression "suspension system" designating any elastic system interposed between the vehicle frame and the surfaces of contact of the vehicle rolling parts with the ground.

Its chief object is to provide a system of this kind which is better adapted to meet the requirements of practice than those used for the same purpose up to the present time.

Preferred embodiments of my invention will be hereinafter described with reference to the appended drawings, given merely by way of example and in which.

Finally.

In the following description, it will be supposed that the invention is applied to the case of an automobile vehicle of the "touring" type including four independent wheels.

Each of these wheels 1 is mounted on a support pivoted to the frame 2 of the vehicle in such manner as to permit the desired vertical displacements of the corresponding wheel, which support can be constituted, for instance, by a longitudinal lever 3 one end of which is pivoted about a transverse axle element 4 fixed to frame 2, whereas its other end supports the wheel 1, for instance through the intermediary of an open forked member 5 permitting pivoting displacements of said wheel about a vertical axis when the wheel is a steering wheel.

I interpose, between frame 2 and each wheel carrying lever 3, a pneumatic device which is constituted by at least two pneumatic cushions $6^s$ and $6^i$ disposed on opposite sides of lever 3 respectively, in such manner as elastically to oppose vertical displacements of the end of said lever on either side of its position of equilibrium. These pneumatic cushions are advantageously housed in a common case 7 fixed to frame 2 and they bear against the opposed ends of said case.

Figure 1:
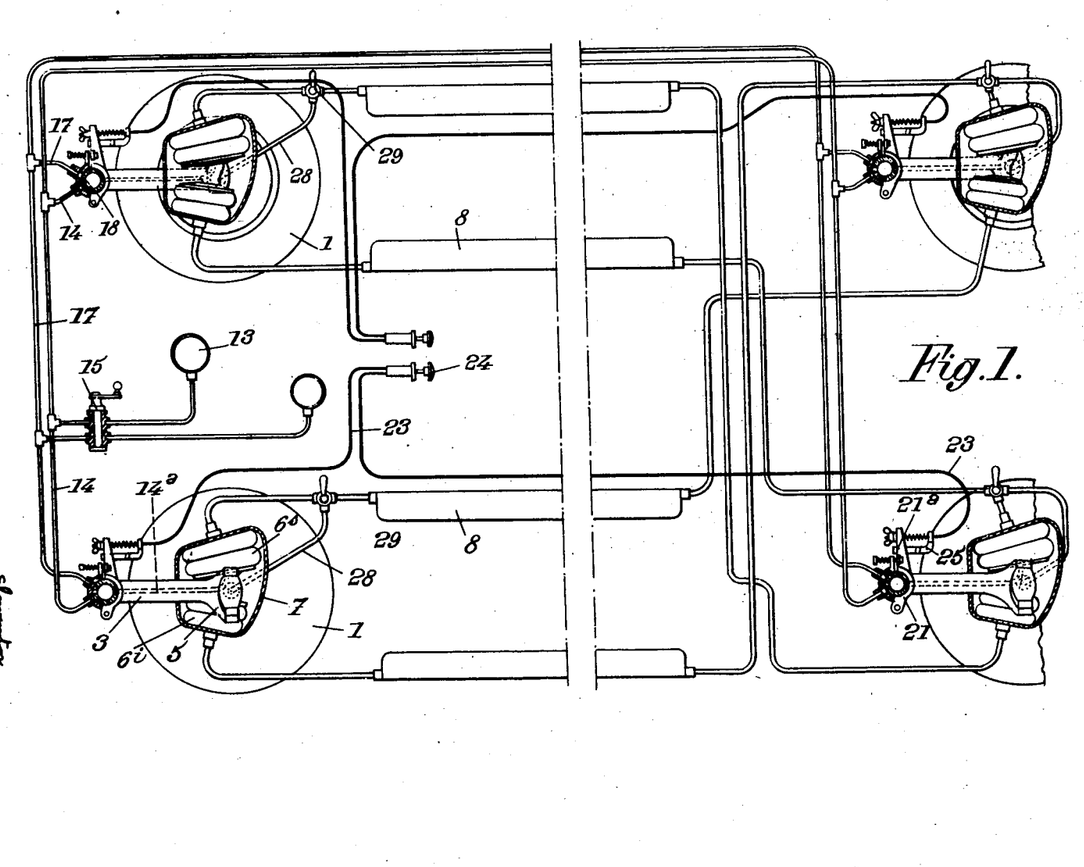
Fig. 1 is a diagram showing a vehicle pneumatic suspension system made according to the invention.
Figure 2:
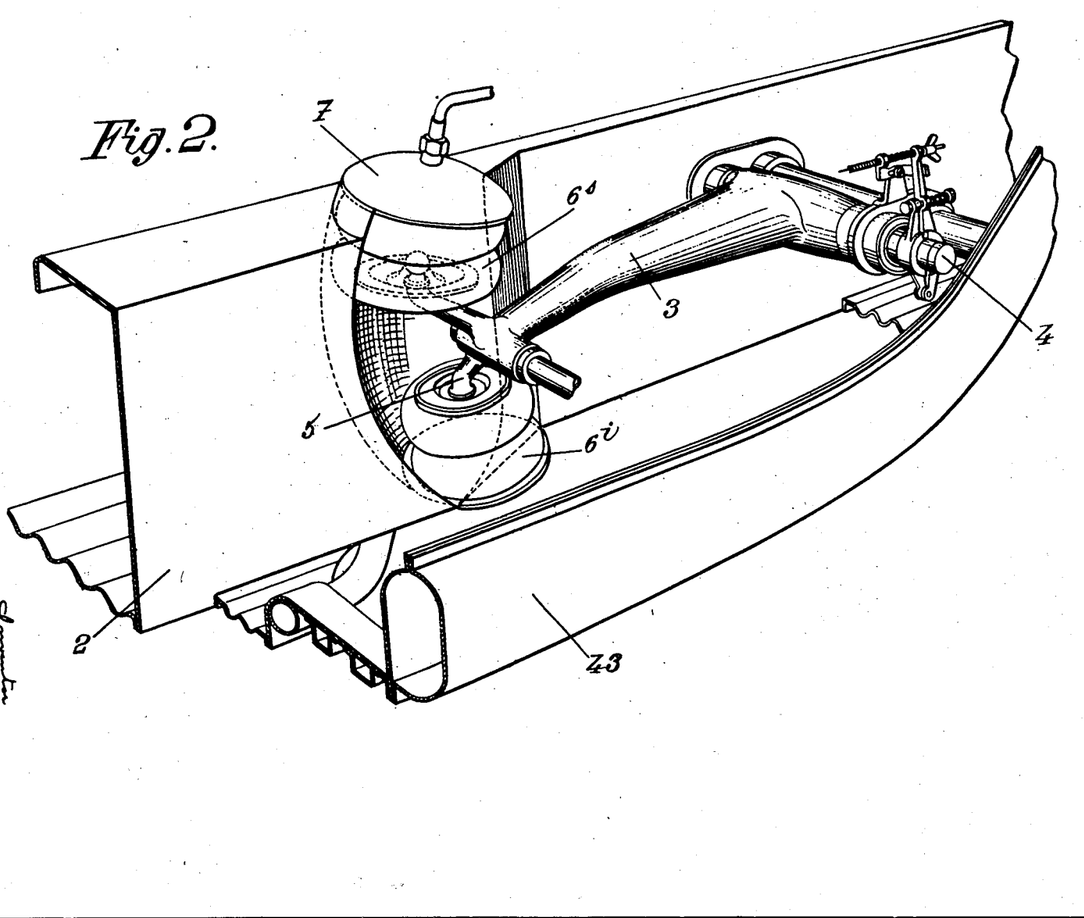
Figs. 2 and 3 show, on a larger scale, respectively in perspective view with certain parts cut off, and in longitudinal section, the chief parts of said system corresponding to a given wheel support.

According to an important feature of my invention, as shown by Fig. 1, I connect the cushion of each wheel supporting means that reacts against wheel displacements in a given direction with the cushion of the diagonally opposed wheel supporting means that reacts against wheel displacements in the opposed direction, an intermediate reservoir 8 being preferably interposed so as to increase the total volume of compressed air corresponding to the two cushions thus interconnected and therefore to improve their flexibility.

It will be understood that, in this way, any temporary rise of pressure in one of the upper cushions $6^s$ (which will hereinafter be called "bearing cushions" since they support a portion of the weight of the car) produces a similar rise of pressure in that of the lower cushions $6^i$ (hereinafter called "counter-cushion") which is diagonally opposed thereto.

Consequently, when a wheel is lifted by an obstacle without its vertical movement producing a substantial displacement of the car, everything takes place as if the diagonally opposed counter-cushion constituted, together with the corresponding intermediate reservoir 8, a supplementary volume adapted to increase the flexibility of the bearing cushion compressed by the lifting of said wheel.

Furthermore, when a wheel undergoes (for instance due to a series of obstacles or undulations of the ground, or due to variations of the centrifugal force or accelerations applied to the center of gravity of the car), a succession of impulses tending to produce an oscillatory movement of the car body either in the longitudinal direction (rolling) or in the transverse direction (pitching) any compression of the bearing cushion of a wheel, as produced by a downward displacement, with respect to said wheel, of the portion of the car supported by it, produces a proportional increase of the pressure in the counter-cushion of the diagonally opposed wheel, which compensates for the upward thrust applied to the portion of the car supported by said last mentioned wheel as a result of said downward displacement of the first mentioned portion of the car and therefore damps the perturbing pendular motion that tends to be started by said downward displacement.

It should be noted that a double damping action will be produced due to the fact that the bearing cushion of the second mentioned wheel is connected to the counter-cushion of the first mentioned wheel, so that the reduction of pressure that occurs in said counter-cushion causes a reduction of the pressure in the bearing cushion of the diagonally opposed wheel and consequently of the force tending to lift said last mentioned wheel.

In any case, while, with a conventional suspension system, any downward displacement of a portion of the vehicle tends to set up a series of oscillations of the body which are maintained, and even amplified if resonance phenomena intervene, with a pneumatic suspension system according to my invention above set forth, perturbing pendular movements are damped as soon as they appear and the road holding and comfort qualities of the car are accordingly considerably improved.

Furthermore, with the longitudinal lever type of suspension that is considered, the keeping of said levers in a substantially constant position of dynamic equilibrium ensures a good working of the car steering system and eliminates a serious drawback inherent in this kind of suspension concerning the steering system.

I may be led, in some cases, to eliminate either the front or the rear counter-cushions, according as the center of gravity of the vehicle is located relatively far toward the front or the rear of the vehicle, a diagonal connection being still provided between the bearing cushions and the counter-cushions that are kept according to the above set forth feature of my invention. I might also, while keeping all the counter-cushions, disconnect, either the front counter-cushions, or the rear counter-cushions, the counter-cushions thus separated increasing the suspension pressure independently of the load of the vehicle.

According to a preferred embodiment, illustrated by Figs. 1 to 5, each bearing cushion or counter-cushion is constituted by a kind of bellows of an elastic material.

The cross-section of each cushion is such that a bearing cushion $6^s$ can support the whole of the load of the wheel, to wit substantially one fourth of the load of the car, and of the reaction effort developed by the antagonistic counter-cushion, whereby the corresponding lever 3 is kept in a substantially horizontal position of equilibrium when the car is stopped.

On the other hand, the height of the cushions is such that their volume becomes practically nil for extreme positions of the wheel support.

Figure 4:
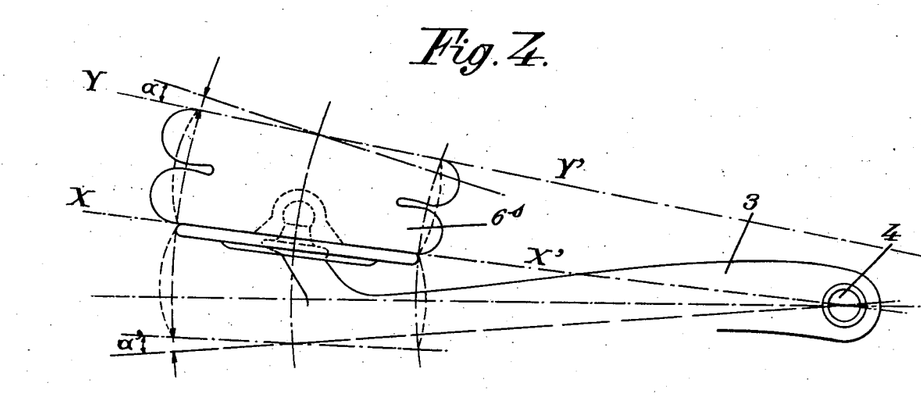
Fig. 4 is a diagram illustrating the operation of some of these parts.

The outer ends of these bellows bear against the respective end walls of a box 7 and their inner ends against the free end of lever 3 through the intermediary of cup-shaped discs 9 inclined in such manner, as diagrammatically shown by Fig. 4, that, in the position of rest, the plane XX' of the disc 9 that bears upon the free end of lever 3 passes substantially through the axis of oscillation of this lever, while the plane YY' of the disc 9 that bears upon the end wall of box 7 passes substantially above or below this axis of oscillation according as the cushion that is considered is a bearing cushion $6^s$ or a counter-cushion $6^i$.

Figure 5:
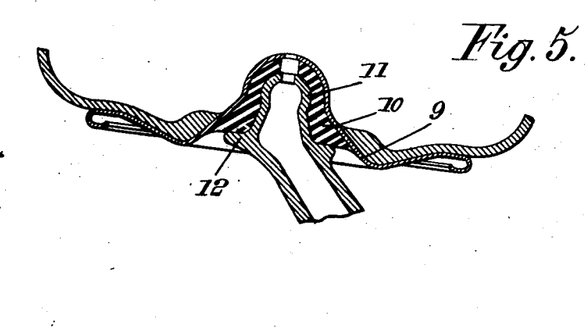
Fig. 5 is a section of one of said parts.

In order to permit the angular relative displacements $\alpha$ (or $\alpha'$) of the two discs corresponding to a given bellows that takes place when said bellows is flattened, I provide an articulation, for instance an elastic connection, between the free end of lever 3 and the disc that bears on said free end, for instance as shown by Fig. 5.

In this embodiment, the disc in question is of conical shape, and the concave outer face of said disc is fitted with an adherent rubber lining 10 forming a housing for a projection 11 of conical shape provided at the end of lever 3, said projection being provided at its base with a circular collar 12 which bears against rubber lining 10 and applies it against disc 9.

Such a joint, in addition to the fact that it can be quickly mounted, permits of ensuring a fluidtight pneumatic connection between the bellows to be fed and a source of compressed air through the inside of lever 3 as it will be more explicitly explained hereinafter. Furthermore, from the kinematic point of view, the angle provided between the planes of the inner and outer discs permits of getting an increased advantage from the expansion of each bellows, the maximum possible vertical deformations of which are greater.

The system according to the embodiment that is being described further includes a direct feed system for all the bearing cushions, which can be constituted by directly connecting said cushions with a source of compressed air, with the provision, for each wheel support, of valve means adapted, after a suitable initial adjustment, to isolate each bearing cushion in such manner as to permit the operation of the diagonal connections between the bearing cushions and the counter-cushions of the diagonally opposed wheels.

Advantageously, such a system is arranged to ensure its own damping, that is to say to brake the expansion movement of the suspension means, i. e. the bearing cushions of each wheel support.

Figure 3:
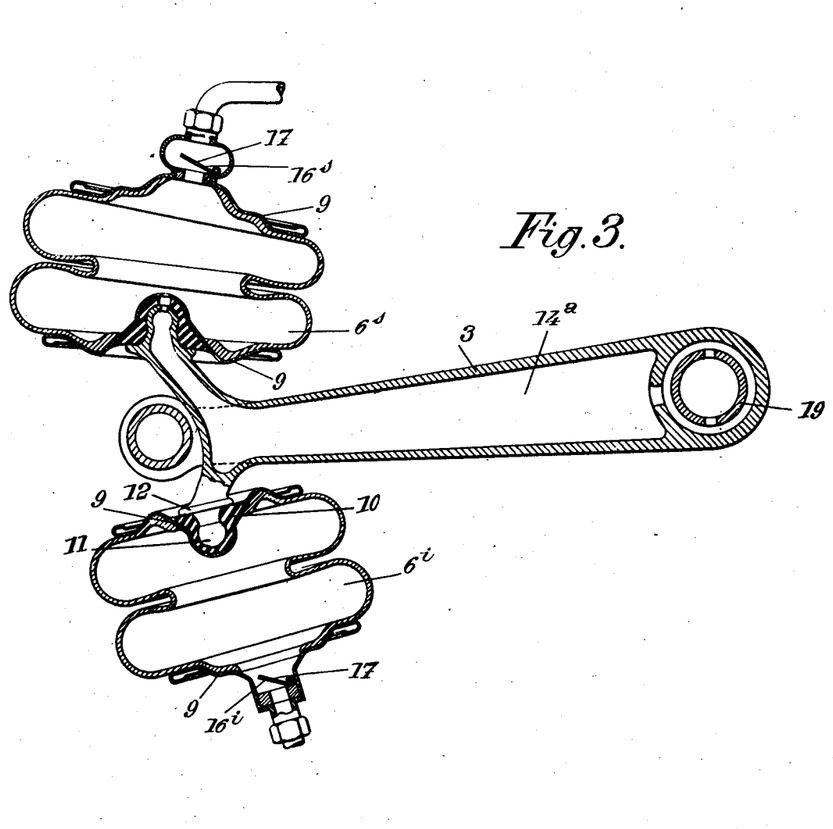

For this purpose, for instance, as shown by Fig. 3, I provide, between each bellows $6^s$ or $6^i$ and the corresponding reservoir 8, valve means for braking of the circulation of air in one direction only. Said valve means can be constituted by a ball or disc device, or by a mere check valve $16^s$ or $16^i$ opening in one direction of flow of air while, for the flow in the opposed direction, a hole 17 provided in said check valve brakes the air stream.

These check valves are disposed in such manner that valve $16^s$ brakes the flow of air from the reservoir toward bearing cushion $6^s$ and valve $16^i$ brakes the flow of air from counter-cushion $6^i$ toward said reservoir.

Thus, expansion of the pneumatic system, which corresponds to an inflow of air into the bearing cushion and a partial discharge of the counter-cushion, will be braked, while compression of said system can take place freely.

Furthermore, the automatic damping thus obtained is proportional not only to the velocity of movement of the wheel support, but also to the amplitude of the vertical movements of said support.

This results from the fact that, for large amplitude movements, the ratio of the volume of a compressed bellows to the volume of the corresponding auxiliary reservoir tends towards zero due to the height chosen for said bellows.

Low amplitude oscillations, upon which depends the comfort of the car, are therefore permitted, while an intensive braking intervenes for displacements of large amplitude the influence of which is bad for a good road holding of the vehicle.

Another feature of my invention is adapted to be applied to any pneumatic suspension system including cushioning means supporting the weight of the vehicle but it will be supposed, in what follows, to be applied to the above described suspension system including bearing cushions and counter-cushions. It consists in providing means for causing the displacements of a certain duration of each wheel support 3 with respect to frame 2 to produce, according to the direction of movement of the wheel support, either a feed under pressure or, on the contrary, a discharge of the corresponding bearing cushion, so that, in particular, the mean position of said wheel support with respect to the frame, and therefore the height of said frame above the ground, remains substantially independent of the variations of the load of the vehicle.

For this purpose, the feed, the isolation, or the discharge of each bearing cushion, and indirectly of the counter-cushion connected therewith, are advantageously controlled through a distributing device responsive to the vertical displacements of the wheel supports, the whole of this distributing device and of the bellows fed therethrough acting in the manner of a pressure relief device. Furthermore, means may be provided for enabling the driver to act at will on this distributing device for modifying the zone of adjustment in which it acts.

For this purpose, I provide a source of compressed air 13 the mean pressure of which is substantially higher than the pressures that are intended to be used in said cushions. I connect this source 13 with a feed circuit 14 leading, through the intermediary of the distributing system, to conduits 14ª provided inside levers 3, the pneumatic connection with the bearing cushions being ensured through parts 11 the ends of which are provided with holes for this purpose.

A cock 15 is interposed, preferably between source 13 and feed circuit 14, so as to permit of feeding, at will, the various bearing cushions and the counter-cushions connected therewith.

A discharge circuit 17 capable for instance of being cut off by the same cock 15 which controls the feed circuit 14 is provided.

Figure 6:
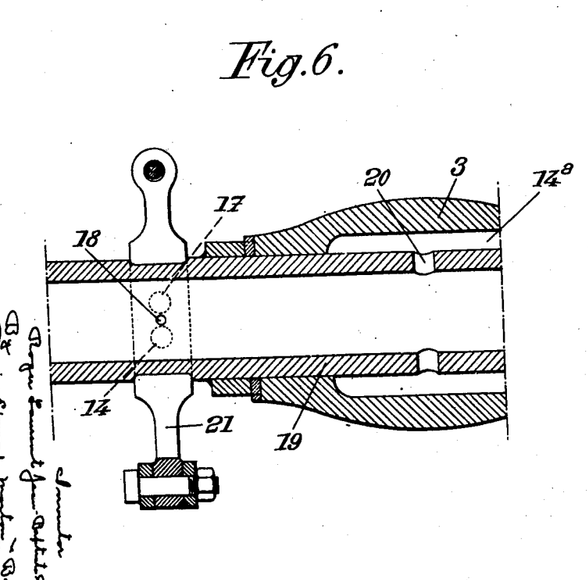
Figs. 6 and 7 show, respectively in axial section and in transverse section, a mechanism of the suspension system corresponding to another feature of my invention.
Figure 7:
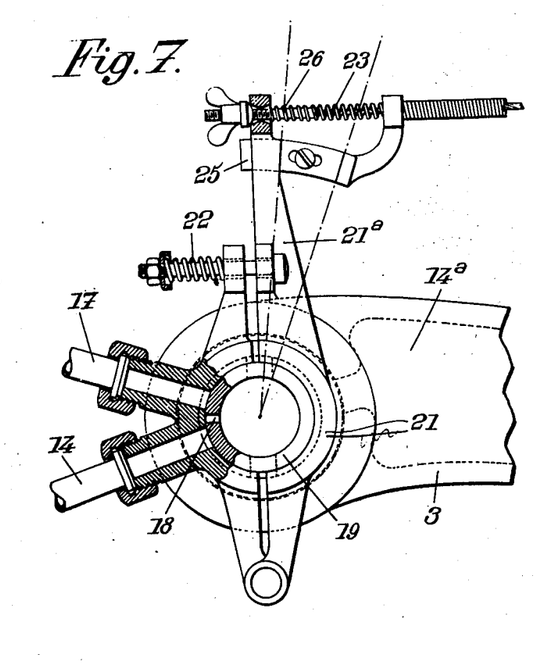
Figure 8:
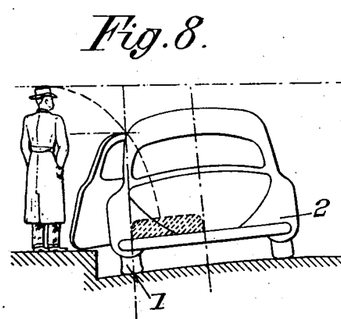
Figs. 8 to 13 are diagrams illustrating various modes of operation and utilization of this mechanism.

The distributing device which ensures the feed of air to the conduit 14ª provided in each lever 3 is so arranged that, according as said lever pivots upwardly under the effect of an increase of the load or, on the contrary, downwardly under the effect of a reduction of the load, conduit 14ª is placed in communication, in the first case with feed circuit 14 and, in the second case, with exhaust circuit 17, a neutral position, shown by Figs. 6 and 7 and corresponding to the horizontal position of lever 3 being provided for which conduit 14ª is isolated from both of these circuits 14 and 17.

The distributing device includes a barrel 19 rigid with lever 3 and having its axis in coincidence with the axis about which lever 3 is pivoted to the vehicle frame. The inside of barrel 19 communicates through holes 20 with the conduit 14ª provided inside lever 3. Another hole 18, provided in the wall of barrel 19, can be brought into communication either with circuit 14, or with circuit 17 by means of a rotary sleeve 21 provided with passages connected with said circuits 14 and 17 respectively.

This rotary sleeve 21 is constituted by two semi-circular jaw-like portions elastically applied against barrel 19 by a spring 22 and fitted with an operating lever 21ª operated from a distance, for instance through a cable 23 and control members 24. An adjustable double abutment 25 is adapted to limit the displacement of sleeve 21 which is constantly urged by a spring 26 toward one of its extreme positions.

If it is only desired, wheel supporting lever 3 being horizontal, to be able to feed compressed air into bearing cushion 6ª with a view to lifting the corresponding side of the car, abutment 25 is so positioned that, when spring 26 has brought back sleeve 21 into its extreme position (shown by Fig. 7), orifice 18 happens to occupy, between the outlets of conduits 14 and 17, the neutral position above defined.

This system for the adjustment of the pressure in the bearing cushions works in the following manner:

Concerning first its automatic operation, that is to say, when sleeve 21 is in a given position, any pivoting displacement tending to move for a certain time lever 3 away from its neutral position will produce a partial inflating or emptying of the corresponding bearing cushion the expansion or contraction of which will bring back said lever 3 to its position of equilibrium. It will then suffice to modify the position of sleeve 21 by means of the corresponding control member 24 to vary the position of equilibrium toward which the system automatically tends to bring back lever 3. It will be understood that a variation of load of the vehicle will not affect the height of the frame above the ground since the pivoting of the wheel supports consecutive to this increase of the load will automatically cause a supplementary amount of air under pressure to be fed to the bearing cushions, thus returning said support toward their normal position of equilibrium. On the contrary, quick oscillations of levers 3 will not permit any substantial flow of air to take place and the working of the bearing cushions connected with the diagonally opposed counter-cushions is not modified.

The manual control of said adjustment system by means of members 24 permits, in addition to the above indicated adjustment of the position of equilibrium, of performing various operations and in particular, supposing that the control means corresponding to the wheels located on the same side of the vehicle are subjected to the action of the same control member 24, the following operations, as diagramatically illustrated by Figs. 8 to 13.

Figure 9:
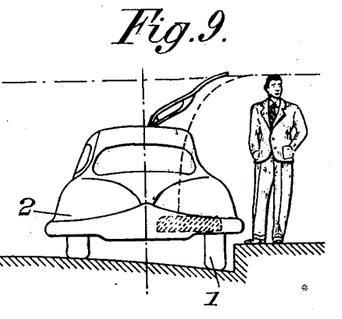

First, when the vehicle is on the edge of a barrelled road or of a high sidewalk, it is possible to facilitate access to the seats by lifting the corresponding side of this vehicle, through operation of the control member corresponding to this side. Fig. 9 further shows that if the vehicle is fitted with doors that retract above the roof according to my co-pending U. S. patent application Ser. No. 654,834, filed Mar. 16, 1946, for Vehicle doors, access to the inside of the vehicle in the unfavorable case that is considered will be much easier than for an ordinary car such as that shown by Fig. 8.

Figure 10:
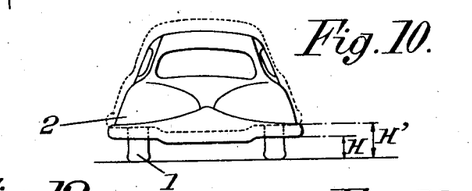

It is also possible, by operating both control members 24, to modify the free height H existing between the lowermost point of the frame and the ground and to obtain a free height $H^1$, for instance greater than H by 50%, which permits circulation of the car on rough ground, this operation being possible without it being necessary to stop the vehicle.

Figure 11:
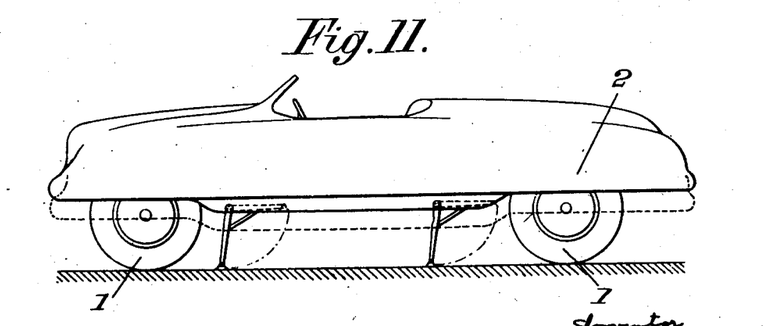

If it is desired to place the car on chocks, both control members 24 are pulled, the sprags are lowered once the frame is lifted (as shown by Fig. 11), and said control members 24 are pushed back, which relieves the suspension system of the weight of the car, the tires then supporting only the weight of the wheels.

Figure 12:
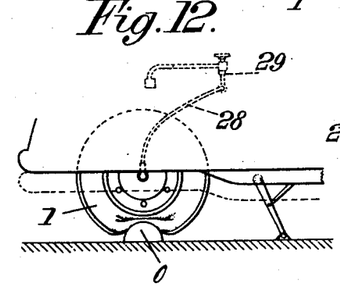
Figure 13:
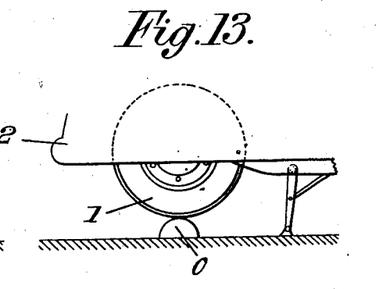

If, now, it is desired to remove a tire, for instance for repairing an inner tube, it is possible to proceed as above indicated for placing the car on chocks, but in this case it will be advantageous to have the wheel in question mounted on an obstacle O, as shown by Figs. 12 and 13, so as to compensate for the collapse of the tire.

Although only car lifting operations have been considered, it will be understood that it would be possible, through a suitable adjustment of the distributing device, to perform wheel retracting operations, for instance in the case of amphibian vehicles.

According to another feature of my invention, which will also be supposed in what follows to be applied to an automobile vehicle fitted with the pneumatic suspension system above described, the inner tube of each of the tires is connected to a source of air under pressure and means are provided for adjusting the pressure in said inner tube as a function of the load of the corresponding elastic element of the suspension system of the car.

For this purpose, I connect each inner tube, through connecting means 27 located on the outer side of the hub of the wheel and a flexible pipe 28 preferably held by a spring, to the conduit connecting the bearing cushion 6ˢ of the corresponding wheel with the corresponding reservoir 8, in which conduit there exists a mean pressure which is a function of the load supported by said wheel.

A cock 29 is adapted to permit of isolating pipe 28 from the suspension system, for instance when it is desired to replace the inner tube (operation shown by Fig. 12).

Owing to this arrangement, made possible by the fact that the pneumatic cushions can be so dimensioned that the suspension pressure is substantially equal to that of the tires (from 1 to 2 kgs. for instance), said tires can be constantly kept at a suitable pressure and any accidental leakage as might occur in one of the inner tubes can be compensated, at least for a certain time.

Figures 14, 15:
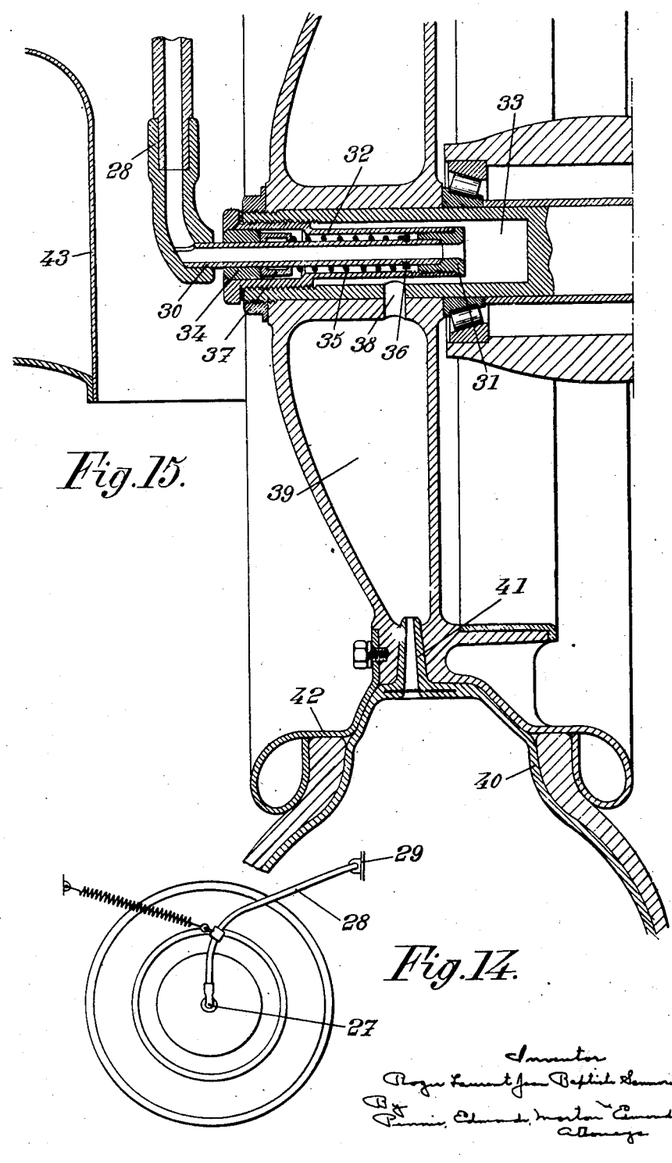
Figs. 14 and 15 show, respectively in end view and in axial section on a larger scale, a wheel fitted with an inflating system made according to a particular feature of my invention.

Preferably, the connecting means 27 are made, in the following manner, as illustrated by Fig. 15:

The end of air inlet conduit 28 is fitted on a tube 30 the end of which bears, preferably through a conical contact surface, against a fluidtight seat 31 carried by a sleeve 32, fixed, for instance, inside a housing 33 provided for this purpose at the end of the wheel carrying shaft.

I provide, as main journal for tube 30, a ring 34 fixed inside sleeve 32. A spring 35 is interposed between an abutment 36 rigid with tube 30 and on a sliding abutment 37 angularly fixed on said tube 30 and which bears against ring 34, whereby the conical end of tube 30 is always elastically pressed against fluidtight seat 31. As tube 30 is kept in a substantially constant angular position by the reinforced end of conduit 28, the rotation movement of the wheel will produce a friction at the surfaces of contact of this tube with ring 34 and seat 31, so that it will be of interest to constitute these surfaces by a self-lubricating matter.

The hub of the wheel is provided with an orifice 38 so as to connect the inside of housing 33, into which opens conduit 30, with an annular cavity 39 provided in the wheel whereby air can reach the rim of said wheel.

Communication between this cavity 39 and inner chamber 40 is ensured by providing in the wheel rim an orifice through which can pass a conical projection 41 fitted for this purpose on a part, preferably reinforced, of said inner tube, eventually with the addition of a small metallic plate or any other reinforcing means, whereby the inner pressure of the tube tends to apply projection 41 into its housing and thus to improve the fluid tightness of the joint.

Preferably, the portion of the rim that is turned toward the outside of the vehicle is constituted by a removable flange 42 fixed to the main body of the wheel for instance by studs and nuts, which permits, in addition to a rapid mounting and removal of the tire, of changing tube 40 without having to touch said tire, as said tube can be passed through the annular space that is left by the removal of flange 42.

Such connecting means have, among others, the following advantages:

Great simplicity and therefore an easy removal and replacement;

Possibility of immediately detecting the existence of an important leak in a tube since the continuous feed of air under pressure will produce a characteristic whistling noise audible to the driver;

Eliminating of all risks of bursting under effect of a rise of pressure due to a rise of temperature, owing to the reversibility of the valve;

Possibility of being used as an excellent earth connection for a radio installation on board the vehicle.

Although no mention has been made up to now concerning the structure of the vehicle frame, it seems particularly advantageous to have recourse in this connection to another feature of my invention to be applied with profit to any vehicle including means for inflating the tires through a connection mounted on the outer end of the hub.

According to this feature, I constitute the main working element of the structure of the vehicle by a frame 43 passing on the outside of the wheels and consequently ensuring protection against shocks of the connecting means which would otherwise be particularly exposed.

Such a frame is, for instance, constituted by an annular girder of closed contour such as that described in my co-pending U. S. patent application Ser. No. 654,833 filed Mar. 16, 1946, which girder advantageously further serves as compressed air reservoir.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the accompanying claims.

What I claim is:

1. In a vehicle including a frame, at least four wheels and a wheel support for each of said wheels movably carried by said frame, a suspension system which comprises, in combination, a pneumatic bearing cushion for each wheel, said bearing cushion being supported by said frame and operatively connected with the corresponding wheel support for opposing upward displacements of the wheel with respect to said frame, a pneumatic counter-cushion for each wheel of at least one of the front and rear wheel sets, said counter-cushion being supported by said frame and operatively connected with the corresponding wheel support for opposing downward displacements of the wheel in question with respect to said frame, and means for connecting at least each of the two counter-cushions belonging to one set of wheels with the bearing cushion of the diagonally opposed wheel, respectively.

2. In a vehicle including a frame, at least four wheels and a wheel support for each of said wheels movably carried by said frame, a suspension system which comprises, in combination, a penumatic bearing cushion for each wheel, said bearing cushion being supported by said frame and operatively connected with the corresponding wheel support for opposing upward displacements of the wheel with respect to said frame, a penumatic counter-cushion for each wheel of at least one of the front and rear wheel sets, said counter-cushion being supported by said frame and operatively connected with the corresponding wheel support for opposing downward displacements of the wheel in question with respect to said frame, means for connecting at least each of the two counter-cushions belonging to one set of wheels with the bearing cushion of the diagonally opposed wheel, respectively, and a reservoir inserted in the connecting means between a bearing cushion and the corresponding counter-cushion.

3. In a vehicle including a frame and at least four wheels, a suspension system which comprises, in combination, a lever pivoted to said frame about a transverse axis for supporting each wheel, a penumatic bellows bearing cushion for each wheel, said bellows including a top end disc fixed to said frame and a bottom end disc bearing on the end of the corresponding wheel supporting lever, a pneumatic bellows counter-cushion for each wheel of at least one of the front and rear wheel sets, said bellows including a bottom end disc fixed to said frame and a top end disc fixed to the end of the corresponding wheel supporting lever, and means for connecting at least each of the two counter-cushions belonging to one set of wheels with the bearing cushion of the diagonally opposed wheel, respectively.

4. In a vehicle including a frame, at least four wheels and a wheel support for each of said wheels movably carried by said frame, a suspension system which comprises, in combination, a pneumatic bearing cushion for each wheel, said bearing cushion being supported by said frame and operatively connected with the corresponding wheel support for opposing upward displacements of the wheel with respect to said frame, a pneumatic counter-cushion for each wheel of at least one of the front and rear wheel sets, said counter-cushion being supported by said frame and operatively connected with the corresponding wheel support for opposing downward displacements of the wheel in question with respect to said frame, means for connecting at least each of the two counter-cushions belonging to one set of wheels with the bearing cushion of the diagonally opposed wheel, respectively, and means for braking the expansion of said bearing cushions.

5. In a vehicle including a frame, at least four wheels and a wheel support for each of said wheels movably carried by said frame, a suspension system which comprises, in combination, a pneumatic bearing cushion for each wheel, said bearing cushion being supported by said frame and operatively connected with the corresponding wheel support for opposing upward displacements of the wheel with respect to said frame, a pneumatic counter-cushion for each wheel of at least one of the front and rear wheel sets, said counter-cushion being supported by said frame and operatively connected with the corresponding wheel support for opposing downward displacements of the wheel in question with respect to said frame, means for connecting at least each of the two counter-cushions belonging to one set of wheels with the bearing cushion of the diagonally opposed wheel, respectively, and means for braking the flow of gas from a counter-cushion toward the bearing cushion with which it is connected.

6. In a vehicle including a frame and at least four wheels, a suspension system which comprises, in combination, a lever pivoted to said frame about a transverse axis for supporting each wheel, a pneumatic bellows bearing cushion for each wheel, said bellows including a top end disc fixed to said frame and a bottom end disc bearing on the end of the corresponding wheel supporting lever, a pneumatic bellows counter-cushion for each wheel of at least one of the front and rear wheel sets, said bellows including a bottom end disc fixed to said frame and a top end disc fixed to the end of the corresponding wheel supporting lever, means for connecting at least each of the two counter-cushions belonging to one set of wheels with the bearing cushion of the diagonally opposed wheel, respectively, and at least one check valve interposed in the last mentioned connecting means, said check valve opening toward the counter-cushion and being provided with a passage of restricted section for braking the flow of gas in the opposite direction.

7. In a vehicle including a frame and at least four wheels, a suspension system which comprises, in combination, a lever pivoted to said frame about a transverse axis for supporting each wheel, a pneumatic bellows bearing cushion for each wheel, said bellows including a top end disc fixed to said frame and a bottom end disc pivotally connected to the end of the corresponding wheel supporting lever, a conduit formed in said lever, a fluidtight joint for connecting the inside of said conduit with the inside of said bellows, controlled means for feeding gas under pressure to said conduit, a pneumatic bellows counter-cushion for each wheel of at least one of the front and rear wheel sets, said bellows including a bottom end disc fixed to said frame and a top end disc pivotally connected to the end of the corresponding wheel supporting lever, and means for connecting at least each of the two counter-cushions belonging to one set of wheels with the bearing cushion of the diagonally opposed wheel, respectively.

8. In a vehicle including a frame, at least four wheels and a wheel support for each of said wheels movably carried by said frame, a suspension system which comprises, in combination, a pneumatic bearing cushion for each wheel, said bearing cushion being supported by said frame and operatively connected with the corresponding wheel support for opposing upward displacements of the wheel with respect to said frame, a pneumatic counter-cushion for each wheel of at least one of the front and rear wheel sets, said counter-cushion being supported by said frame and operatively connected with the corresponding wheel support for opposing downward displacements of the wheel in question with respect to said frame, means for connecting at least each of the two counter-cushions belonging to one set of wheels with the bearing cushion of the diagonally opposed wheel, respectively, and means for automatically adjusting the pressure in said cushions to keep said wheel supports in a given mean position with respect to said frame irrespective of load variations on said vehicle.

9. In a vehicle including a frame, at least four wheels and a wheel support for each of said wheels movably carried by said frame, a suspension system which comprises, in combination, a pneumatic bearing cushion for each wheel, said bearing cushion being supported by said frame and operatively connected with the corresponding wheel support for opposing upward displacements of the wheel with respect to said frame, a pneumatic counter-cushion for each wheel of at least one of the front and rear wheel sets, said counter-cushion being supported by said frame and operatively connected with the corresponding wheel support for opposing downward displacements of the wheel in question with respect to said frame, means for connecting at least each of the two counter-cushions belonging to one set of wheels with the bearing cushion of the diagonally opposed wheel, respectively, means for automatically adjusting the pressure in said cushions to keep said wheel supports in a given mean position with respect to said frame irrespective of load variations on said vehicle, said last mentioned means being adjustable, and means for adjusting said adjustable means to vary said mean position of at least two wheel supports located on the same side of said vehicle.

10. In a vehicle including a frame and at least four wheels, a suspension system which comprises, in combination, a lever pivoted to said frame about a transverse axis for supporting each wheel, a pneumatic bellows bearing cushion for each wheel, said bellows including a top end disc fixed to said frame and a bottom end disc pivotally connected to the end of the corresponding wheel supporting lever, a conduit formed in said lever, a fluidtight joint for connecting the inside of said conduit with the inside of said bellows, a source of gas under pressure, a discharge pipe rotary valve means, responsive to angular displacements of said lever from its mean position with respect to said frame, for connecting said conduit with either said source or said pipe according as said lever is on one side or the other of its mean position, whereby said lever is automatically restored to said mean position irrespective of the load on said vehicle, a pneumatic bellows counter-cushion for each wheel of at least one of the front and rear wheel sets, said bellows including a bottom end disc fixed to said frame and a top end disc pivotally connected to the end of the corresponding wheel supporting lever, and means for connecting at least each of the two counter-cushions belonging to one set of wheels with the bearing cushion of the diagonally opposed wheel, respectively.

11. In a vehicle including a frame and at least four wheels, a suspension system which comprises, in combination, a lever pivoted to said frame about a transverse axis for supporting each wheel, a pneumatic bellows bearing cushion for each wheel, said bellows including a top end disc fixed to said frame and a bottom end disc pivotally connected to the end of the corresponding wheel supporting lever, a conduit formed in said lever, a fluidtight joint for connecting the inside of said conduit with the inside of said bellows, a source of gas under pressure, a discharge pipe rotary valve means, responsive to angular displacements of said lever from its mean position with respect to said frame, for connecting said conduit with either said source or said pipe according as said lever is on one side or the other of its mean position, whereby said lever is automatically restored to said mean position irrespective of the load on said vehicle, means operative by the vehicle driver for adjusting said rotary valve means so as to permit of determining at will said mean position of said lever with respect to said frame, a pneumatic bellows counter-cushion for each wheel of at least one of the front and rear wheel sets, said bellows including a bottom end disc fixed to said frame and a top end disc pivotally connected to the end of the corresponding wheel supporting lever, and means for connecting at least each of the two counter-cushions belonging to one set of wheels with the bearing cushion of the diagonally opposed wheel, respectively.

12. In a vehicle including a frame, at least four wheels and a wheel support for each of said wheels movably carried by said frame, a suspension system which comprises, in combination, a pneumatic bearing cushion for each wheel, said bearing cushion being supported by said frame and operatively connected with the corresponding wheel support for opposing upward displacements of the wheel with respect to said frame, a pneumatic counter-cushion for each wheel of at least one of the front and rear wheel sets, said counter-cushion being supported by said frame and operatively connected with the corresponding wheel support for opposing downward displacements of the wheel in question with respect to said frame, means for connecting at least each of the two counter-cushions belonging to one set of wheels with the bearing cushion of the diagonally opposed wheel, respectively, a pneumatic tire for each wheel, and means for placing the inside of each of said tires in communication with the inside of the corresponding bearing cushion, whereby the pressure in said tire varies in accordance with the load supported by said last mentioned cushion.

13. In a vehicle including a frame and at least four wheels, a suspension system which comprises, in combination, a lever pivoted to said frame about a transverse axis for supporting each wheel, a pneumatic bellows bearing cushion for each wheel, said bellows including a top end disc fixed to said frame and a bottom end disc bearing on the end of the corresponding wheel supporting lever, a pneumatic bellows counter-cushion for each wheel of at least one of the front and rear wheel sets, said bellows including a bottom end disc fixed to said frame and a top end disc fixed to the end of the corresponding wheel supporting lever, means for connecting at least each of the two counter-cushions belonging to one set of wheels with the bearing cushion of the diagonally opposed wheel, respectively, a pneumatic tire for each wheel, and means for placing the inside of each of said tires in communication with the inside of the corresponding bearing cushion, whereby the pressure in said tire varies in accordance with the load supported by said last mentioned cushion.

14. In a vehicle including a frame, at least four wheels and a wheel support for each of said wheels movably carried by said frame, a suspension system which comprises, in combination, a pneumatic bearing cushion for each wheel, said bearing cushion being supported by said frame and operatively connected with the corresponding wheel support for opposing upward displacements of the wheel with respect to said frame, a pneumatic counter-cushion for each wheel of at least one of the front and rear wheel sets, said counter-cushion being supported by said frame and operatively connected with the corresponding wheel support for opposing downward displacements of the wheel in question with respect to said frame, means for connecting at least each of the two counter-cushions belonging to one set of wheels with the bearing cushion of the diagonally opposed wheel, respectively, means for automatically adjusting the pressure in said cushions to keep said wheel supports in a given mean position with respect to said frame irrespective of load variations on said vehicle, a hub for each wheel, a pneumatic tire for each of said wheels, means for connecting each of said tires with the corresponding bearing cushion adapted to permit inflating of said tire as the vehicle is running, said connecting means passing through the outer end of the hub of the corresponding wheel, and an element forming the main working member of the vehicle frame passing around said vehicle on the outside of said wheels for protecting said connecting means.

ROGER LAURENT JEAN BAPTISTE
          SANMORI.

REFERENCES CITED

The following references are of record in the file of this patent:

UNITED STATES PATENTS

| Number | Name | Date |
|---|---|---|
| 1,322,196 | Meyers | Nov. 18, 1919 |
| 1,538,661 | Salus | May 19, 1925 |
| 1,654,034 | Campos | Dec. 27, 1927 |
| 1,706,162 | Howarth et al. | Mar. 19, 1929 |
| 1,800,142 | Heagney | Apr. 7, 1931 |
| 1,801,716 | Bowers | Apr. 21, 1931 |
| 1,827,662 | Maas | Oct. 13, 1931 |
| 1,974,171 | Bizzarri | Sept. 18, 1934 |
| 2,042,596 | Gouirand | June 2, 1936 |
| 2,354,700 | Pezzano | Aug. 1, 1944 |

FOREIGN PATENTS

| Number | Country | Date |
|---|---|---|
| 270,235 | Great Britain | June 2, 1927 |
| 716,087 | France | Oct. 5, 1931 |